Jan. 17, 1967     G. GATTI     3,298,682
DOCUMENT ALIGNING AND FEEDING DEVICE
Filed Sept. 30, 1964     3 Sheets-Sheet 1
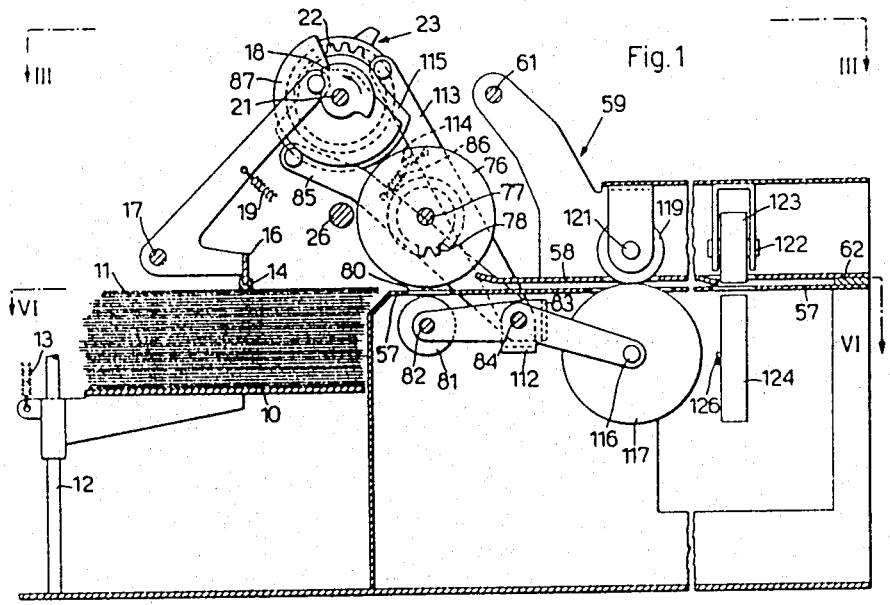
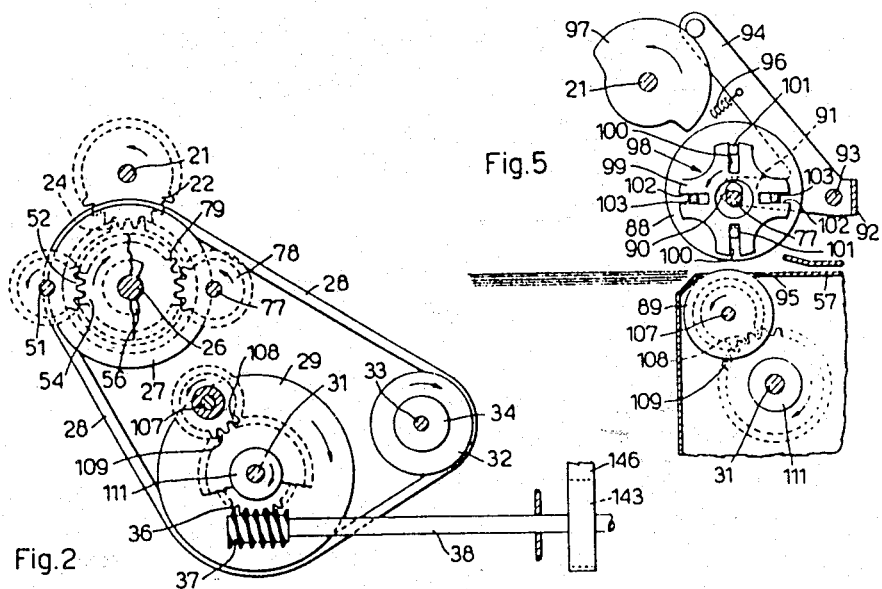
INVENTOR.
GIANCARLO GATTI
BY John Toggenburger
AGENT

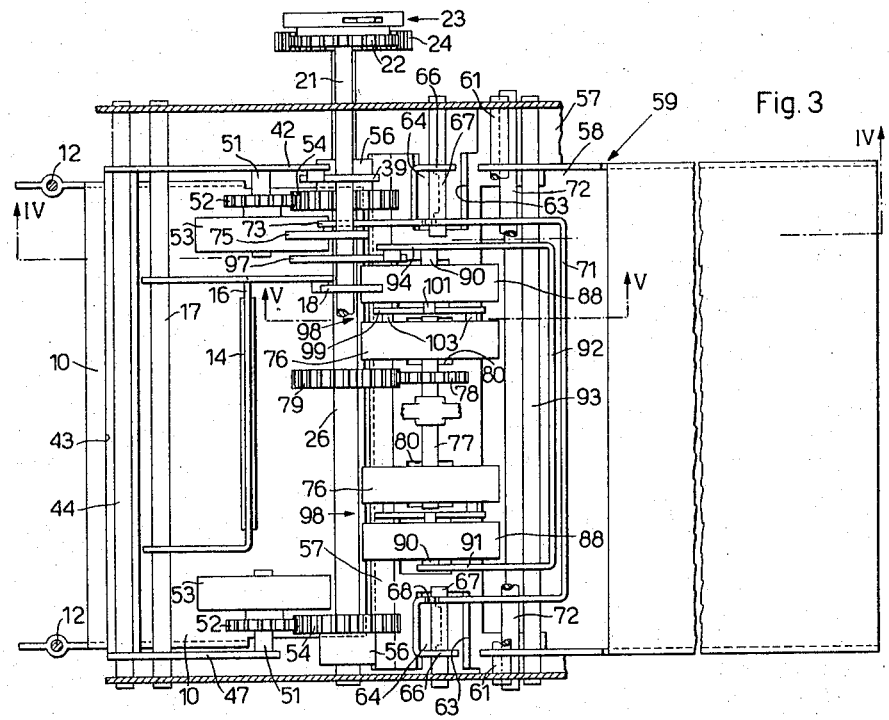
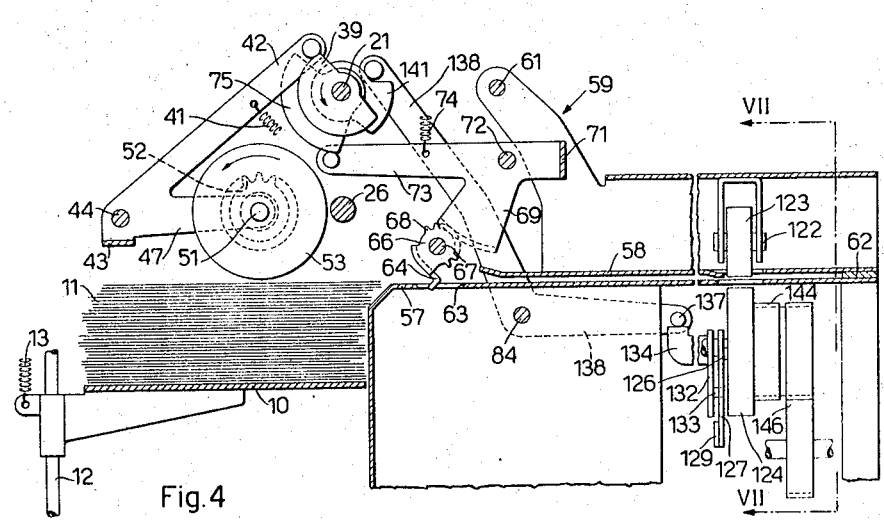

Jan. 17, 1967   G. GATTI   3,298,682
DOCUMENT ALIGNING AND FEEDING DEVICE
Filed Sept. 30, 1964   3 Sheets-Sheet 3
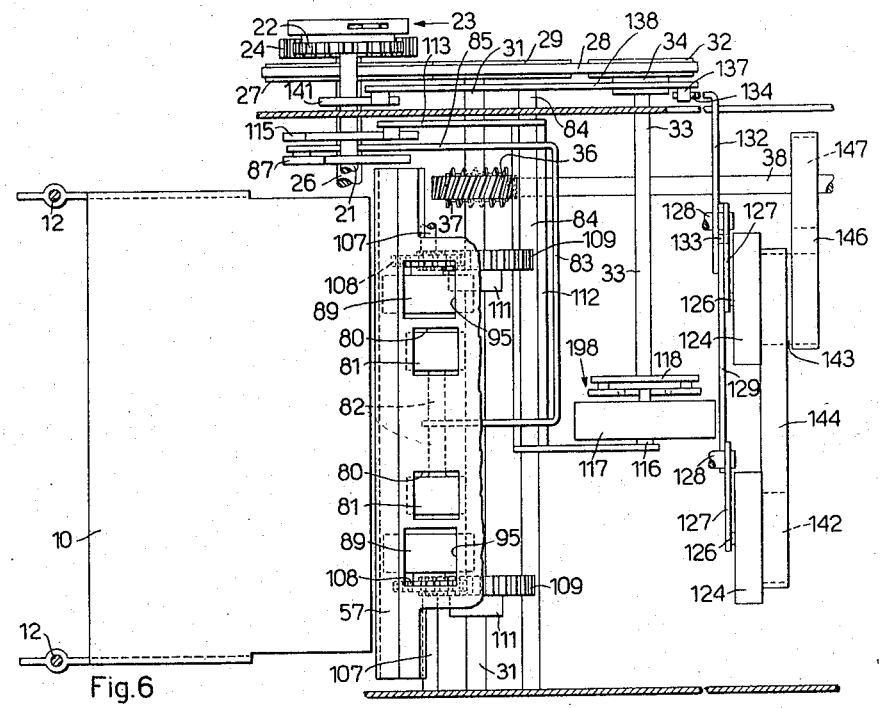
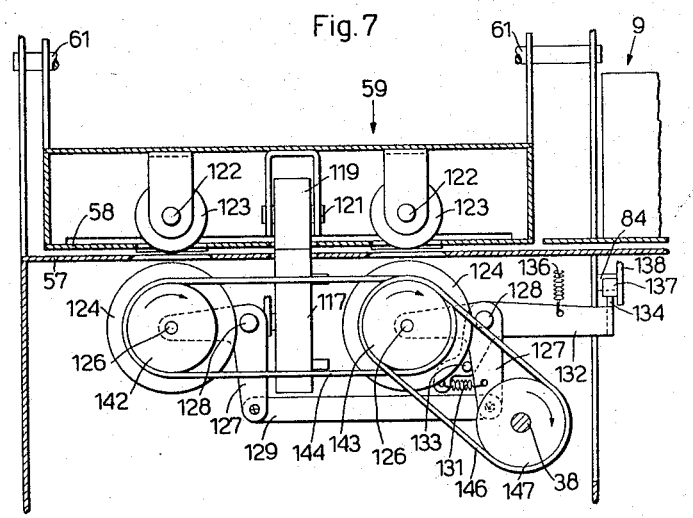

3,298,682
DOCUMENT ALIGNING AND FEEDING DEVICE
Giancarlo Gatti, Milan, Italy, assignor to Ing. C. Olivetti & C., S.p.A., Ivrea, Italy, a corporation of Italy
Filed Sept. 30, 1964, Ser. No. 400,359
Claims priority, application Italy, Oct. 8, 1963, 20,865/63
7 Claims. (Cl. 271—4)

This invention relates to a document aligning and feeding device having taking up means for taking up a plurality of documents from the top of a document stack and for urging same in a predetermined direction, document separating means for returning all documents of said plurality but the top document to said stack, and aligning means for urging said top document against a stationary member to finely align said top document before being fed perpendicular to said direction.

The document handling machines, for example the document sorting machines, require a fine alignment of the document before being fed therein, in order to correctly read the data recorded in form of holes, magnetic or optic characters. Some types of said documents, for example the bank checks, have different sizes from one to the other, whereby the documents of a stack are too often misaligned and cannot be fed by the conventional feeding devices for punched cards having a uniform size. Furtherwmore, since said checks are generally made with a thin paper the simultaneous feeding of more than one check is to be prevented.

There are known document aligning and feeding devices comprising separating means for preventing two or more checks from being fed simultaneously by returning all checks of a plurality of checks but the top one to the stack. However, when the checks of the stack are too misaligned, for example rocked more than 10 degrees the checks returned to the stack are often damaged. Therefore in the known aligning and feeding devices, the check stack must be manually aligned before supplying the device, a lot of time being often lost for said manual alignment.

This disadvantages is obviated by the document aligning and feeding device according to the invention, which is very simple and reliable in the operation and is adapted to correct misalignment substantially till 45 degrees and to feed documents having very different sizes. More particularly, said device is characterized by temporarily effective means for arresting said plurality of documents between said taking up means and said aligning means to preliminary align same, means being provided for rendering ineffective said temporarily effective means after a predetermined time from the arresting instant of said plurality of documents, whereby only said top document so preliminary aligned is urged toward said aligning means.

This and other characteristics of the invention will become apparent from the following description of a preferred embodiment thereof and from the accompanying drawings, wherein:

FIG. 1 is a right hand longitudinal partial sectional view of a document aligning and feeding device according to the invention;

FIG. 2 is another right hand longitudinal partial sectional view of the device;

FIG. 3 is a partial plan view taken on the line III—III of FIG. 1;

FIG. 4 is a sectional view taken on the line IV—IV of FIG. 3;

FIG. 5 is a sectional view taken on the line V—V of FIG. 3;

FIG. 6 is a partial plan view taken on the line VI—VI of FIG. 1;

FIG. 7 is a sectional plan view taken on the line VII—VII of FIG. 4.

With reference to FIG. 1, the numeral 10 indicates a horizontal plate adapted to support a stack of documents 11, for example bank checks, which are to be individually fed in a reading device 9 (FIG. 7), for example of a check selecting and sorting machine. The plate 10 (FIGS. 1 and 3) is slidable on two stationary vertical shafts 12 and is urged by a spring 13 to contact through the document stack 11 a stop bar 14 secured to a bail 16 fulcrumed on a shaft 17. The bail 16 is urged by a spring 19 prevailing over the spring 13 to contact a cam 18 secured to a main shaft 21 comprised in a cyclically operating mechanism. Rotatably mounted on the shaft 21 is a toothed wheel 22 adapted to be connected with the shaft 21 for 360 degrees by a one cycle clutch 23 known per se. The wheel 22 meshes with a toothed wheel 24 (FIGS. 2 and 6) secured to a shaft 26 rotatably mounted on the machine frame. Secured to the shaft 26 is also a pulley 27 connected by a belt 28 with a second pulley 29 secured to a rotatably mounted shaft 31 and a third pulley 32 connected to another rotatably mounted shaft 33 through a friction joint 34 known per se. Secured to the shaft 31 is also a gear 36 meshing with worm gear 37 secured to a longitudinal shaft 38 adapted to be continuously rotated clockwise (FIG. 7) by an electric motor not shown in the drawings.

The document aligning and feeding device comprises taking up means for taking up a plurality of documents from the top of the stack 11 and for urging same in a predetermined direction. More particularly, said taking up means comprise a pair of taking up rollers 53 (FIGS. 3 and 4) made of a material having a high coefficient of friction, for example rubber. Each roller 53 is rotatably mounted on a pin 51 secured to a corresponding arm 47 of a bail 43 pivoted on a stationary shaft 44. Another arm 42 of the bail 43 is urged by a spring 41 to contact a cam 39 of the main shaft 21, thus holding normally the rollers 53 a little bit distance from the stack 11. Secured to each roller 53 is a toothed wheel 52 meshing with a corresponding toothed wheel 54 (FIG. 2) connected through a friction joint 56 known per se to the shaft 26. The documents taken up by the rollers 53 are urged toward a horizontal guide formed of a stationary horizontal plate 57, and another horizontal plate 58 carried by a support 59 pivoted at 61 and normally contacting a stationary member or bar 62 secured to the plate 57.

Furthermore the device comprises document separating means for returning all documents taken up by the rollers 53 but the top document to the stack 11. Said separating means comprises a pair of separating rollers 89 (FIGS. 5 and 6) made of a material having a high coefficient of friction and each one rotatably mounted on a stationary pivot 107 and secured to a toothed wheel 108 meshing with a corresponding toothed wheel 109 connected to the shaft 31 by a friction joint 111. Each separating roller 89 is adapted to cooperate through a corresponding aperture 95 of the plate 57 with a corresponding counter-roller 88 (FIGS. 3 and 5) made of a material having a coefficient of friction higher than the roller 89. Each counter-roller 88 is rotatable on a pivot 90 carried by a corresponding arm 91 of a bail 92 pivoted on a stationary shaft 93. Another arm 94 of the bail 92 is urged by a spring 96 to contact a cam 97 of the main shaft 21.

The device comprises also a pair of advancing rollers 76 (FIGS. 1 and 3) secured to a common pivot 77 and each one adjacent to one of the counter-rollers 88. The pivot 77 is rotatably mounted on the machine frame and is coaxial with the pivot 90 of the counter-rollers 88 when these latter contact the corresponding separating rollers 89 (FIG. 5), whereby the pivot 77 is normally slightly lower than the pivots 90. Secured to the pivot 77 is a toothed wheel 78 (FIGS. 2 and 3) meshing with a toothed wheel 79 (FIG. 2) secured to the shaft 26. Each roller 76 is adapted to cooperate through a corresponding aperture 80 (FIGS. 1 and 6) with an idle roller 81 rotatably mounted on a pivot 82 secured to a bail 83 fulcrumed on a stationary shaft 84. The bail 83 is provided with an arm 85 urged by a spring 86 to contact a cam 87 of the main shaft 21. Each roller 76 is connected to the adjacent counter-roller 88 by a joint 98 (FIG. 3) adapted to constantly transmit motion from the advancing roller 76 to the counter-roller 88 irrespective of the position of the pivot 90. Each joint 98 is formed of a plate 99 (FIG. 5) having a pair of opposite notches 100 engaged by a pair of pins 101 secured to the counter-roller 88, and a pair of notches 102 distanced 90 degrees from the notches 100 and engaged by a pair of pins 103 secured to the advancing roller 76 (FIG. 3).

Furthermore, the device comprises aligning means adapted to urge the top document of a stack in a predetermined direction against the bar 62 to finely align said top document before being fed perpendicular to said direction. More particularly, said aligning means comprise an aligning roller 117 (FIGS. 1 and 6) made of a material having a high coefficient of friction, and rotatably mounted on a pivot 116 of a bail 112 fulcrumed on the shaft 84. An arm 113 of the bail 112 is urged by a spring 114 to contact a cam 115 of the main shaft 21, which causes the roller 117 to normally contact an idler roller 119 rotatably mounted on a pin 121 of the support 59. The roller 117 is connected to a disk 118 secured to the shaft 33 through a joint 198 similar to the joints 98 (FIG. 3) connecting each advancing roller 76 to the adjacent counter-roller 88.

Furthermore, the device comprises temporarily effective means for arresting the documents between the taking-up rollers 53 and the aligning roller 117 to preliminarily align same. Said temporarily effective means comprise a pair of similar members or bails 64 (FIGS. 3 and 4) located at the opposite sides of the separating rollers 89 and counter-rollers 88 in a pair of apertures 63 of the plate 57. Each bail 64 is pivoted by means of two arms 66 on a stationary pivot 67. One of the two arms 66 of each bail 64 is provided with a toothed edge 68 meshing with a corresponding toothed sector 69. The two sectors 69 are integral with a bail 71 pivoted on a stationary shaft 72 and having an arm 73 urged by a spring 74 to contact a cam 75 of the main shaft 21.

Finally, the device comprises two feeding rollers 124 (FIG. 7) each one adapted to cooperate with a corresponding idler roller 123 rotatably mounted on a corresponding pivot 122 of the support 59 for feeding the finely aligned top document parallelly to the bar 62 (FIG. 1). Each roller 124 is rotatably mounted on a pivot 126 secured to a corresponding lever 127 (FIG. 7) fulcrumed on a stationary pivot 128. The two levers 127 are connected by a link 129, whereas one of the levers 127 is urged by a spring 131 to contact a pin 133 of a lever 132 fulcrumed on the corresponding pivot 128. A bent lug 134 of the lever 132 is urged by a spring 136 to contact a pin 137 of a lever 138 (FIG. 4) fulcrumed on the shaft 84 and normally contacting a cam 141 of the main shaft 21. Each one of the two rollers 124 (FIGS. 6 and 7) is secured to a corresponding pulley 142, and 143 respectively, connected by a belt 144. Another belt 146 connects the pulley 143 with a pulley 147 secured to the shaft 38.

The document aligning and feeding device operates as follows.

The shaft 38 (FIG. 7) is continuously rotated clockwise by the electric motor of the machine at a predetermined angular speed, and through the belts 146 and 144 continuously frictionally rotates the pulleys 143 and 142 together with the feeding rollers 124 at a substantially equal angular speed. Furthermore the shaft 38, through the worm 37 (FIG. 2) and the gear 36, continuously rotates the shaft 31 clockwise at an angular speed lower than said predetermined speed. The shaft 31 through the belt 28 continuously rotates clockwise the pulley 27 together with the shaft 26, and the pulley 32 which through the friction joint 34 rotates the shaft 33. Furthermore the shaft 31, through the friction joints 111 and the wheels 109 and 108, continuously rotates the separating rollers 89 (FIG. 5) counterclockwise. In turn the shaft 26 on one hand through the wheel 24 (FIG. 2) continuously rotates the wheel 22 counterclockwise, on the other hand through the wheel 79 rotates counterclockwise the wheel 78 together with the pivot 77 and the advancing rollers 76 (FIG. 4), which through the joints 98 rotate the adjacent counter-rollers 88. The shaft 26 through the friction joints 56 and the wheels 54 and 52 continuously rotates the taking up rollers 53 (FIG. 4) counterclockwise.

When the clutch 23 (FIG. 1) is engaged by manually or automatically operated control means not shown in the drawings, the wheel 22 rotates the main shaft 21 counterclockwise to effect a machine cycle. At the beginning of the cycle the cam 141 (FIG. 4) rocks clockwise the lever 138 which through the pin 137 rocks the lever 132 (FIG. 7) clockwise. The lever 132 through the spring 131 rocks the two levers 127 and causes the feeding rollers 124 to contact the corresponding idle rollers 123. Since at present no document is located between the rollers 123 and 124 their action has no effect.

Simultaneously, on one hand the cam 18 (FIG. 1) rocks the bail 16 counterclockwise to release the document stack 11 from the stop bar 14, on the other hand the cam 39 (FIG. 4) causes the spring 41 to rock the bail 43 clockwise, thus bringing the taking up rollers 53 to contact the stack 11. Now the rollers 53 take up a plurality of documents, which may be very misaligned on the stack 11, and they urge said documents forwards (rightwards in FIG. 4). The number of the taken up documents depends on the coefficient of the friction between the documents and is variable with the type of paper used for the documents and with the condition thereof. The two friction joints 56 (FIG. 3) cause the taking up rollers 53 to be independently rotated for urging the documents toward the two bails 64, which temporarily arrest the documents to preliminary aligning same on the transverse line connecting the two bails.

Thereafter the cam 115 (FIG. 1) rocks the bail 112 clockwise, whereby the aligning roller 117 is removed from the idle roller 119. Now the cam 97 (FIG. 5) causes the spring 96 to rock the bail 92 counterclockwise, thus pressing the documents arrested by the bail 64 between the counter-rollers 88 and the document separating rollers 89 slightly to the rear of arresting line of the bails 64. Since the rollers 89 and the counter-rollers 88 rotate counterclockwise, all documents but the top document are removed from the bails 64 and returned to the stack 11, the top document being held aligned on the bails 64 by the taking-up rollers 53 and by the counter-rollers 88.

After a predetermined time from the arresting instant of the taken up documents, the cam 141 (FIG. 4), through the lever 138, causes the spring 136 (FIG. 7) to rock the lever 132 counterclockwise. The pin 133 of the lever 132 rocks now the levers 127 counterclockwise, whereby the feeding rollers 124 are removed again from the idle rollers 123. Simultaneously, the cam 87 (FIG. 1) causes the spring 86 to rock the bail 83 clockwise, whereby the top document arrested by the bails 64 is now pressed between the advancing rollers 76 and the idle rollers 81. In turn the cam 75 (FIG. 4) causes the spring 74 to rotate the bail 71 clockwise. The two bails 64 are now rocked counterclockwise by the sectors 69 and are located in an ineffective position out of the path of the preliminary aligned document, which is therefore released.

Then the advancing rollers 76 (FIG. 1) advance the top document toward the aligning roller 117, while the separating rollers 89 prevent other documents from being advanced. Now the cam 39 (FIG. 4) rocks the bail 43 clockwise to remove the taking up rollers 53 from the stack 11, while the cam 18 (FIG. 1) causes the spring 19 to return the bail 16 clockwise whereby the stop bar 14 locks again the stack 11.

Thereafter the cam 115 causes the spring 114 to rock the bail 112 counterclockwise, whereby the advanced top document is now pressed between the aligning roller 117 and the idle roller 119, while the cam 87 through the bail 83 removes the rollers 81 from the advancing rollers 76, and the cam 97 (FIG. 5) through the bail 92 removes the counter-rollers 88 from the separating rollers 89. The top document is now urged by the roller 117 against the bar 62 to be finely aligned before being fed, the friction joint 34 (FIG. 6) allowing the roller 117 to be stopped when the top document has been arrested by the bar 62. Near the end of the cycle, the cam 75 (FIG. 4) through the bail 71 restores the bails 64 in the effective position of FIG. 4.

The top document so finely aligned will be fed rightwards (FIG. 7) to the reading device 9 during the first part of the next following cycle of the main shaft 21, while another document is preliminary aligned on the bails 64 (FIG. 4). In fact at the beginning of said next cycle the cam 141 causes the aligned document to be pressed between the feeding rollers 124 (FIG. 7) and the idle rollers 123. Thereafter the cam 115 (FIG. 1) removes the roller 117 from the roller 119, whereby said aligned document is fed by the rollers 124 (FIG. 7) at high speed toward the reading device 9.

It is intended that modifications, improvements and addtion of parts may be made to the described document aligning and feeding device, without departing from the scope of the invention. For example the various cams of the main shaft 21 (FIG. 1) may operate the corresponding mechanism through yieldable means in order to prevent the documents from being damaged during operation. Furthermore, in order to make easy the return movement of the documents on the stack 11, the spring 13 may be connected to a member adapted to be moved by such a cam of the shaft 21 as to reduce the tension of the spring 13 during the engagement of the sepaarting rollers 89 (FIG. 5) with the counter-rollers 88.

What I claim is:

1. In a document aligning and feeding device having aligning means for urging the top document of a document stack in a predetermined direction against a stationary member to finely align said top document before being fed perpendicular to said direction, the combination comprising:
    (a) taking up means for taking up a plurality of documents from the top of said stack and for urging same toward said aligning means,
    (b) a pair of document separating rollers mutually contacting along a predetermined line and adapted to return all documents of said plurality but said top document to said stack,
    (c) temporarily effective means for arresting said plurality of documents between said taking up means and said aligning means to preliminarily align same substantially on said line,
    (d) and means for rendering ineffective said temporarily effective means after a predetermined time from the arresting instant of said plurality of documents, whereby only said top document so preliminarily aligned is urged toward said aligning means.

2. In a document aligning and feeding device having aligning means for urging the top document of a document stack in a predetermined direction against a stationary member to finely align said top document, the combination comprising:
    (a) taking up means for taking up a plurality of documents from the top of said stack and for urging same toward said aligning means,
    (b) a pair of document separating rollers mutually contacting along a predetermined line and adapted to return all documents of said plurality but said top document to said stack,
    (c) a pair of members located at the opposite sides of said separating rollers and temporarily effective for arresting said plurality of documents between said taking up means and said aligning means to preliminarily align same substantially on said line,
    (d) means for rendering said pair of members ineffective after a predetermined time from the arresting instant of said plurality of documents, whereby only said top document so preliminarily aligned is urged toward said aligning means,
    (e) and feeding means for feeding said top document so finely aligned perpendicular to said direction at a higher speed than said aligning means.

3. In a document aligning and feeding device having aligning means for urging the top document of a document stack in a predetermined direction against a stationary member to finely align said top document before being fed perpendicular to said direction, the combination comprising:
    (a) taking up means for taking up a plurality of documents from the top of said stack and for urging same toward said aligning means,
    (b) a pair of document separating rollers rotating in a predetermined sense,
    (c) a pair of members located at the opposite sides of said separating rollers and temporarily effective for arresting said plurality of documents between said taking up means and said aligning means to preliminarily align same on a predetermined line,
    (d) a pair of counter-rollers associated with said pair of rollers and rotatably mounted on a pair of movable pivots,
    (e) means for causing each one of said rollers and the associated counter-roller to temporarily contact each other substantially along said line,
    (f) means for rotating said counter-rollers in said sense so as to return all documents of said plurality but the top document to said stack,
    (g) and means for rendering said pair of members ineffective after a predetermined time from the arresting instant of said plurality of documents, whereby only said top document so preliminarily aligned is urged toward said aligning means.

4. In a document aligning and feeding device having aligning means for urging the top document of a document stack in a predetermined direction against a stationary member to finely align said top document before being fed perpendicular to said direction, the combination comprising:
    (a) taking up means for taking up a plurality of documents from the top of said stack and for urging same toward said aligning means,
    (b) a pair of document separating rollers rotating in a predetermined sense,
    (c) a pair of members located at the opposite sides of said separating rollers and temporarily effective for arresting said plurality of documents between said taking up means and said aligning means to preliminarily align same on a predetermined line,
    (d) a pair of counter-rollers associated with said pair of separating rollers and rotatably mounted on a pair of movable pivots,
    (e) means for moving said pair of movable pivots to cause said separating rollers to temporarily contact said pair of counter-rollers substantially along said line, (f) means for rotating said counter-rollers in said sense so as to return all documents of said plurality but the top document to said stack,
(g) a pair of advancing rollers mounted on a stationary pivot coaxial to said movable pivots when said counter-rollers contact said separating rollers,
(h) a pair of joints each one adapted to constantly transmit motion from said advancing rollers to said counter-rollers,
(i) and means for rendering said pair of members ineffective after a predetermined time from the arresting instant of said plurality of documents, whereby only said top document so preliminarily aligned is urged towards said aligning means.

5. In a document aligning and feeding device having aligning means for urging the top document of a document stack in a predetermined direction against a stationary member to finely align said top document before being fed perpendicular to said direction, the combination comprising:
(a) taking up means for taking up a plurality of documents from the top of said stack and for urging same toward said aligning means,
(b) a pair of document separating rollers rotating in a predetermined sense,
(c) a pair of members located at the opposite sides of said separating rollers and temporarily effective for arresting said plurality of documents between said taking up means and said aligning means to preliminarily align same on a predetermined line,
(d) a pair of counter-rollers associated with said pair of separating rollers and rotatably mounted on a pair of movable pivots,
(e) means for moving said pair of movable pivots to cause said separating rollers to temporarily contact said pair of counter-rollers substantially along said line,
(f) means for rotating said counter-rollers in said sense so as to return all documents of said plurality but the top document to said stack,
(g) a pair of advancing rollers mounted on a stationary pivot coaxial to said movable pivots when said counter-rollers contact said separating rollers,
(h) a pair of joints each one adapted to constantly transmit motion from said advancing rollers to said counter-rollers,
(i) means for rendering said pair of members ineffective after a predetermined time from the arresting instant of said plurality of documents,
(j) and a pair of idle rollers adapted to contact said advancing rollers when said pair of members is rendered ineffective to advance said top document so preliminarily aligned from said pair of members to said aligning means, 6. In a document aligning and feeding device having an aligning roller frictionally rotated for urging the top document of a document stack in a predetermined direction against a stationary member to finely align same, the combination comprising:
(a) taking up means for taking up a plurality of documents from the top of said stack and for urging same toward said aligning roller,
(b) document separating means adapted to return all documents of said plurality but said top document to said stack,
(c) temporarily effective means for arresting said plurality of documents between said taking up means and said aligning roller to preliminarily align same,
(d) means for rendering ineffective said temporarily effective means after a predetermined time from the arresting instant of said plurality of documents, whereby only said top document so preliminarily aligned is urged toward said aligning roller,
(e) and a set of feeding rollers for feeding said top document so finely aligned perpendicular to said direction at a higher speed than said aligning roller.

7. In a document aligning and feeding device having an aligning roller frictionally rotated for urging the top document of a document stack in a predetermined direction against a stationary member to finely align same, the combination comprising:
(a) taking up means for taking up a plurality of documents from the top of said stack and for urging same toward said aligning roller,
(b) document separating means adapted to return all documents of said plurality but the top document to said stack,
(c) temporarily effective means adapted to arrest said plurality of documents between said taking up means and said aligning roller to preliminarily align same,
(d) means for rendering ineffective said temporarily effective means after a predetermined time from the arresting instant of said plurality of documents, whereby only said top document so preliminarily aligned is urged toward said aligning roller,
(e) a set of feeding rollers conditionable for feeding said top document so finely aligned perpendicular to said direction at a higher speed than said aligning roller,
(f) a cyclically operating mechanism for controlling said taking up means, said separating means, said means for rendering and said aligning roller to so align said top document in a predetermined cycle,
(g) and means operable by said mechanism for conditioning said feeding rollers in the cycle next following said predetermined cycle.

References Cited by the Examiner

UNITED STATES PATENTS

| | | | |
|---|---|---|---|
| 672,529 | 4/1901 | Hunter | 271—53 |
| 1,098,234 | 5/1914 | Dexter | 271—53 |
| 1,570,592 | 1/1926 | Parker | 271—53 X |
| 2,224,137 | 12/1940 | Breman et al. | 271—10 |
| 2,246,508 | 6/1941 | Davidson | 271—53 X |
| 3,168,309 | 2/1965 | Schopp et al. | 271—10 X |

SAMUEL F. COLEMAN, *Primary Examiner.*